No. 730,647. PATENTED JUNE 9, 1903.
T. W. HAYNIE & E. G. HALL.
FISH TRAP.
APPLICATION FILED NOV. 3, 1902.
NO MODEL. 2 SHEETS—SHEET 1.
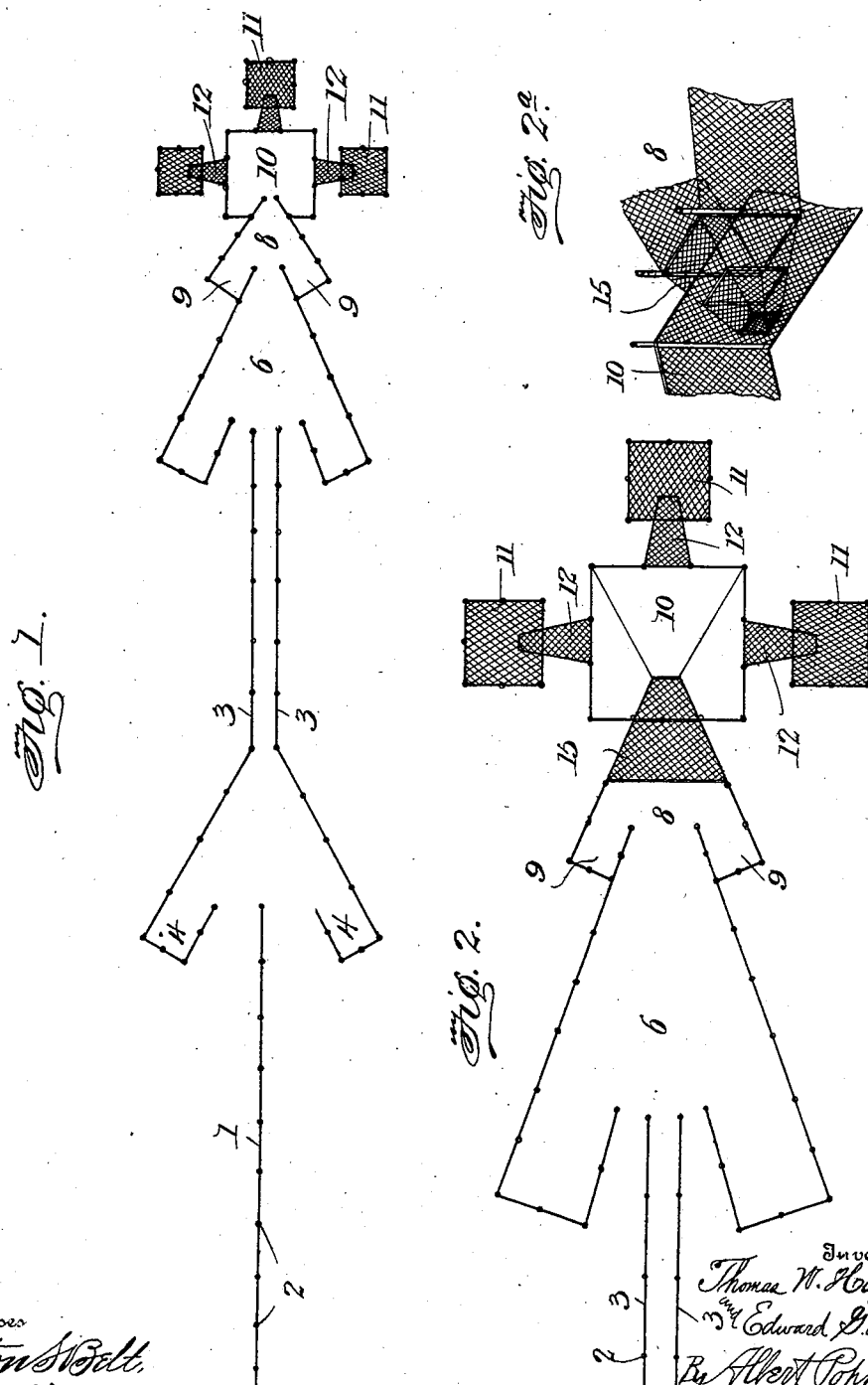

No. 730,647. PATENTED JUNE 9, 1903
T. W. HAYNIE & E. G. HALL.
FISH TRAP.
APPLICATION FILED NOV. 3, 1902.
NO MODEL. 2 SHEETS—SHEET 2.
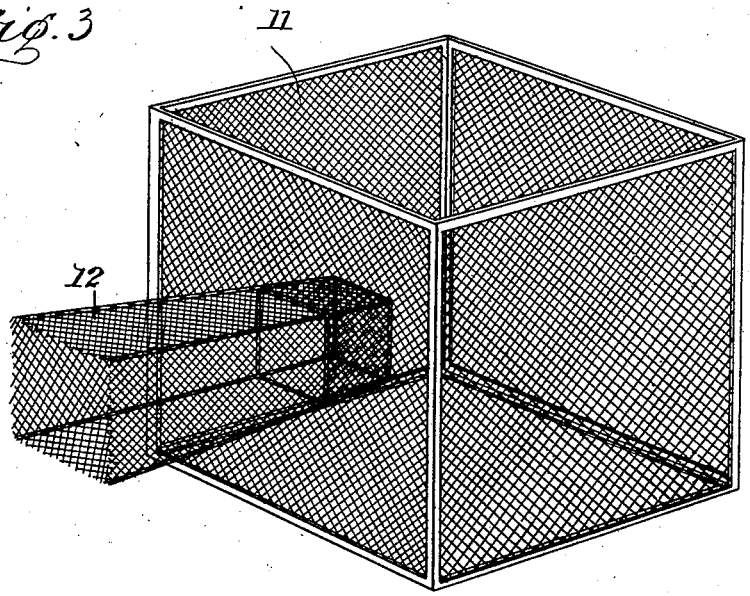
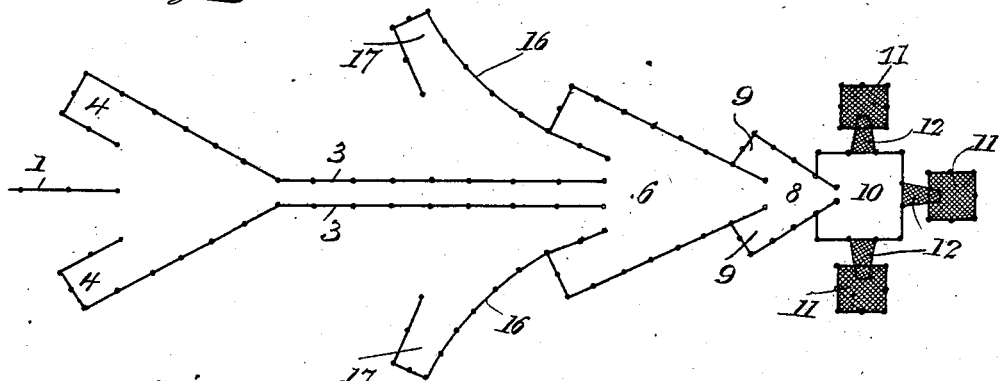
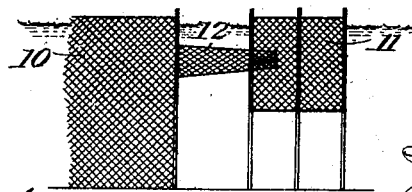
Witnesses
Fenton S. Belt.
John J. Nelligan.
Inventors
Thomas W. Haynie
Edward G. Hall.
By Albert Popkins
Their Attorney.

No. 730,647. Patented June 9, 1903.

UNITED STATES PATENT OFFICE.

THOMAS WILLIAM HAYNIE, OF TIBITHA, AND EDWARD GOLDSBOROUGH HALL, OF LYNHAMS, VIRGINIA.

FISH-TRAP.

SPECIFICATION forming part of Letters Patent No. 730,647, dated June 9, 1903.

Application filed November 3, 1902. Serial No. 129,972. (No model.)

*To all whom it may concern:*

Be it known that we, THOMAS WILLIAM HAYNIE, residing at Tibitha, and EDWARD GOLDSBOROUGH HALL, residing at Lynhams, in the county of Northumberland and State of Virginia, citizens of the United States, have invented certain new and useful Improvements in Fish-Traps; and we do hereby declare the following to be a full, clear, and exact description of the invention, such as will enable others skilled in the art to which it appertains to make and use the same.

Our invention relates to certain improvements in fish-traps of that general class in which the fish are guided into pounds by lead-nets extending from the shore-line.

In all pound-nets the length of the lead is limited, as it has been satisfactorily proven that the increase in length of lead does not result in a corresponding increase in the catch. The length of lead with which the best results are accomplished is usually about one hundred fathoms, and it is necessary to place a pound or trap at the end of the lead or at each hundred fathoms. This necessitates considerable extra expense both in the length of net and in setting and working the same.

One object of the invention is to increase the effective length of the lead without material increase in the lead by the employment of what may be termed "false" leads, of which the initial are so arranged as to discharge into second false leads, and all leading into final traps and a terminal pound.

A further object of the invention is to construct a trap in which the leads are so disposed as to guide the fish into the pounds from either direction, the trap being effective in both directions of tidal flow without any alteration or adjustment.

A still further object of the invention is to so arrange the main and false leads as to prevent the passage of fish between the leads in passing up or down stream by the provision of false pounds and auxiliary wings.

A still further object of the invention is to provide small collecting-pounds as auxiliaries to the main pound, so that the fish may be collected without disturbing the main pound, thus leaving room for the fish caught on successive tides.

With these and other objects in view, as will appear when the nature of the device is more fully disclosed, the invention consists in the novel construction and arrangement of parts hereinafter described, illustrated in the accompanying drawings, and particularly pointed out in the appended claims, it being understood that various changes may be made in the size and proportions of the various parts without departing from the spirit or sacrificing any of the advantages of our invention.

In the accompanying drawings, Figure 1 is a plan view of the fish-trap constructed in accordance with the invention. Fig. 2 is a similar view drawn to a somewhat larger scale and illustrating a slight modification. Fig. 2<sup>a</sup> is a detail perspective view illustrating the funnel. Fig. 3 is a detail perspective view of one of the collectors detached. Fig. 4 is a plan view illustrating a further modification of the invention, and Fig. 5 is a side elavation showing the relative position of the collectors to the main pound.

Similar numerals of reference are employed to designate corresponding parts in the several figures of the drawings.

The main leader 1 is an upright net supported by suitable piles or stakes 2 and extends outward from the shore-line for any desired distance, usually one hundred fathoms. At this point the usual practice is to place a pound; but in the present instance this main leader extends partly within two false leaders 3, spaced from each other to form a passage for fish which have been directed thereinto by the main leader. The ends of the false leaders diverge at a slight angle and are thence turned to form false pounds 4, and the extreme ends of the false leaders terminate in alinement with the end of the main leader A. The arrangement is such as to form a heart in which the fish are kept by the false pound, and there is little danger of the fish escaping. The fish striking the main leader from either direction are directed into the narrow passage between the false leaders and from thence into a second heart 6, having similar false pounds 7. The fish, which may strike the outer sides of the false leaders 3 from both directions, will also be guided into the heart 6, and in this way the effective length of the leaders may be double that in common use with but small expense and without adding to the labor. The heart 6 has a discharge-mouth leading into a smaller heart 8, having false pounds 9, and the last heart leads to the main pound 10. The main pound may be of any suitable dimensions, and the fish may be gathered therefrom in the usual manner. The gathering of fish from the main pound is, however, objectionable, as the fish are disturbed and frighten entering fish away, while many of the fish are gilled and loss is occasioned and the net often broken when the gilled fish are attacked by others. To prevent this, we employ a plurality of small collectors 11, arranged on three sides of the main pound. These collectors are each in the form of cubes or other suitable shape closed at the bottom and open at the top and of a depth equal to about one-third or one-half of the depth of the water in which they are fished and in communication with the pound through freely-flexible funnels 12 of sufficient length to allow the collector to be raised to the top of the water without disturbing the main pound, and in raising the collectors to the top of the water the flexible funnel closes to prevent the escape of fish back to the main pound.

In Fig. 2 the arrangement of the parts is the same, with the exception of the connection of the last heart with the pound. In this case a funnel 15 is employed, through which the fish are guided into the pound.

In order to further lessen the risk of loss of fish, the hearts may be provided with false wings 16, as indicated in Fig. 4. In this case the inner lines of the false pounds are extended, as shown, to form false pounds or pockets 17.

The advantages gained from the use of a double leader are numerous and readily apparent to persons skilled in this art. As the effective length of lead is increased, while employing but a single pound, the labor is reduced and the yield is increased, owing to the fact that the fish striking either lead need only trace the net for the usual distance before entering a heart or false pound, it being understood that mere length of lead does not increase the catch beyond a certain distance.

The collectors reduce the work of fishing a pound in that they collect the fish at each tide and give room for other fish coming in, allowing much larger openings for the entrance of the fish to the main pound and if made of netting of small mesh will retain herring, which might otherwise escape from the larger-mesh net of the pound, if the latter be of the standard size for shad or other fish.

Having thus described our invention, what we claim as new, and desire to secure by Letters Patent, is—

1. In a fish-trap, a pound, a main leader, a pair of false leaders starting at about the terminal line of the main leader and disposed in general alinement with the same, said false leaders being spaced apart to form a passage for the fish directed thereinto by the main leader and after the fish have passed the end of the main leader; substantially as described.

2. In a fish-trap, a pound, a pair of spaced false leaders, a main leader extending outwardly beyond the entrance to the false leaders and terminating within the entrance to the false leaders, the outer ends of said false leaders diverging and being turned to form false pounds; substantially as described.

3. In a fish-trap, a main pound, a heart leading thereto, a second heart discharging into the first, a pair of false leaders extending within the mouth of the second heart and spaced to form three passages thereinto, said false leaders having divergent ends terminating in false pounds, and a main leader terminating at the entrance end of the false leaders; substantially as described.

4. In a fish-trap, a pound, a pair of spaced false leaders, hearts disposed between the discharge end of the false leaders and the pound, and a main leader terminating at the entrance end of the false leaders; substantially as described.

5. In a fish-trap, a pound, a heart communicating therewith, spaced false leaders in communication with the heart and leaving three passages thereinto, one on each side of the false leaders, and another between them, and a main leader terminating at the entrance ends of the false leaders; substantially as described.

6. In a fish-trap, a main pound, a plurality of small collectors having open tops and closed bottoms, elongated flexible funnels extending between the pound and the collectors to thereby permit the collection of fish without disturbing the main pound, and supporting means for the collectors; substantially as described.

In testimony whereof we affix our signatures in presence of two witnesses.

THOMAS WILLIAM HAYNIE.
EDWARD GOLDSBOROUGH HALL.

Witnesses:
J. A. PALMER, Jr.,
A. JETT EDWARDS.